United States Patent [19]
Berger et al.

[11] Patent Number: 6,110,853
[45] Date of Patent: Aug. 29, 2000

[54] MODIFIED COMPOSITE SILICON NITRIDE POWDERS FOR THERMAL COATING TECHNOLOGIES AND PROCESS FOR THEIR PRODUCTION

[75] Inventors: Lutz-Michael Berger, Dresden; Mathias Herrmann, Meissen; Manfred Nebelung, Dresden; Robert B. Heimann, Freiberg; Bernhard Wielage, Meinberg, all of Germany

[73] Assignee: Fraunhofer-Gesellschaft zur Derung der Angewandten Forschung e.V., Munich, Germany

[21] Appl. No.: 09/147,063

[22] PCT Filed: Mar. 15, 1997

[86] PCT No.: PCT/EP97/01317

§ 371 Date: Feb. 11, 1999

§ 102(e) Date: Feb. 11, 1999

[87] PCT Pub. No.: WO97/36820

PCT Pub. Date: Oct. 9, 1997

[30] Foreign Application Priority Data

Apr. 1, 1996 [DE] Germany .................. 196 12 926

[51] Int. Cl.[7] .................. C04B 35/596; C04B 35/599
[52] U.S. Cl. .................. 501/97.4; 501/96.3; 501/97.2; 501/97.1; 501/98.1; 501/98.3; 428/402; 428/446; 428/450
[58] Field of Search .................. 428/96.3, 97.1, 428/97.2, 97.4, 98.1, 98.3, 402, 446, 450; 427/452

[56] References Cited

U.S. PATENT DOCUMENTS

| | | | |
|---|---|---|---|
| 4,226,914 | 10/1980 | Terner et al. | 428/446 |
| 4,377,564 | 3/1983 | Dahlberg | 423/349 |
| 4,539,251 | 9/1985 | Sugisawa et al. | |
| 5,114,693 | 5/1992 | Hintermayer et al. | |
| 5,435,825 | 7/1995 | Kusui et al. | 75/232 |
| 5,472,487 | 12/1995 | Chin et al. | 427/452 |
| 5,700,309 | 12/1997 | Zivkovic et al. | 427/452 |
| 5,767,025 | 6/1998 | Miyake et al. | 501/97.2 |
| 5,912,200 | 6/1999 | Miyake et al. | 501/97.4 |

FOREIGN PATENT DOCUMENTS

| | | |
|---|---|---|
| 118249 | 9/1984 | European Pat. Off. . |
| 63-169371 | 7/1988 | Japan . |

OTHER PUBLICATIONS

Lugscheider et al., "Plasmaspritzen Agglomerierter Pulver auf der Basis $Si_3N_4$ {Plasma Spraying of Agglomerated Powders Based on $Si_3N_4$}", pp. 224–225, Aug. 29, 1990.

Eckhardt et al, "Development of Plasma Sprayed Silicon/Silicon Nitride Coatings by in situ Nitriding", DVS Deutscher Verband Fur Schweibtechnik E.V, XP002035290, Mar. 1996.

Primary Examiner—Karl Group
Attorney, Agent, or Firm—Greenblum & Berstein, P.L.C.

[57] ABSTRACT

The invention concerns the field of ceramics and relates to modified composite silicon nitride powders as used, for example, for coating highly stressed components. It is the aim of the invention to provide modified composite silicon nitride powders and a process for their production by means of which silicon nitride coatings can be produced by prior art coating techniques. This aim is achieved by a modified silicon nitride powder in which silicon nitride particles are contained in an oxide-nitride or silicon binder matrix, where the binder matrix occupies 10 to 40% by volume of the total volume of the powder and the powder particle size $d_{90} \leq 100$ $\mu$m. The aim is also achieved by a process in which a mixture is made containing silicon nitride and/or silicon and one or more oxides or mixtures of oxides or containing silicon or silicon and silicon nitride, said mixture is homogenised and then granulated, subjected to single or multi-stage tempering in a nitrogen-containing atmosphere at a pressure of 0.5 to 100 bar ground.

39 Claims, No Drawings

MODIFIED COMPOSITE SILICON NITRIDE POWDERS FOR THERMAL COATING TECHNOLOGIES AND PROCESS FOR THEIR PRODUCTION

BACKGROUND OF THE INVENTION

1. Field of the Invention

The invention concerns the field of ceramics and mechanical engineering and relates to modified silicon nitride composite powders for thermal coating technologies as used, for example, for coating highly stressed components, such as chemical equipment, for example, by means of thermal spraying, and a process for producing such modified silicon nitride composite powders.

2. Discussion of Background

As a result of its favorable chemical, thermal, and mechanical properties, silicon nitride is a material that can be used in many ways (L. Michalowsky, Neue keramische Werkstoffe [New Ceramic Materials], Deutscher Verlay für Grundstoffindustrie, Leipzig Stuttgart, 1994, p. 395–432). Processing silicon nitride into coatings through various coating technologies, but especially through thermal spraying, has been attempted repeatedly. Sublimation or decomposition hinders processing without additives. In the past, therefore, silicon nitride coatings were attempted to be produced by means of various materials engineering approaches and spraying processes.

In use of composite powders of silicon nitride with metals such as nickel (E. Lugscheider, R. Limbach A. Liden, J. Lodin, High Temp. Mater. Power Eng. 1990, Proc. Conf., Vol. 1, p. 877–880), coatings are indeed produced, but they are comprised of brittle silicides. The properties of these coatings are entirely unsatisfactory for technical applications.

Furthermore, silicon nitride coatings have been attempted to be produced through reactive spraying of metallic silicon in a nitrogen atmosphere onto pre-heated graphite substrates (T. Eckardt, W. Malléner, D. Stöver, Proc. 7th National Thermal Spray Conference 1994, ASM International, p. 515–519). However, the reaction rate is so slow that only a very low nitridation is achieved and thus only a non-homogeneous silicon nitride coating can be produced. Only at very high temperatures is a high nitridation achieved on the outer surface of the coating. However, the process is altogether inappropriate for metallic components owing to the high nitridation temperatures used (up to 1,200° C.).

Furthermore, coating powders have been attempted to be produced that comprise larger particles of a non-fusing but decomposing material such as $Si_3N_4$ or SiC. These larger particles are surrounded by several small particles of an easily fusing material, such as $Al_2O_3$ or spinel (JP, A, 63169371).

In addition to the ratio of sizes of two particles that is unfavorable for thermal coating techniques the non-fusing component is not adequately protected by the easily-fusing particle surrounding it.

EP,A, 0 118 249 discloses a granulated composition that consists of 50–99 parts of a powdered material (powdered metals, temperature-resistant ceramics, cermets, and resins) and of 1 to 50 parts whiskers that act as reinforcing material for the metals, ceramics, and plastics.

The only known successful attempt so far to produce coatings containing silicon nitride with known thermal coating techniques is the use of pre-reacted sialons ($Si_{6-x}Al_xO_xN_{8-x}$ where x=3–4) having a high degree of substitution (S. Sodeoka, K. Ueno, Y. Hagiwara, S. Kose, J. Thermal Spray Technology, Vol. 1 (1992), p. 153–159). In this way, coatings containing silicon nitride can be produced that have a porosity of >30% and are thus not dense.

The disadvantage of all prior art processes for producing silicon nitride coatings is that so far, no silicon nitride powders could be produced with which silicon nitride coatings that are usable for technical applications could be produced with known coating techniques.

SUMMARY OF THE INVENTION

It is the aim of the invention to provide modified silicon nitride composite powders for thermal coating techniques and a process for their production by means of which silicon nitride coatings that can be used for technical applications can be produced with known coating technologies.

This aim is achieved through the invention specified in the claims.

In the modified silicon nitride composite powder for thermal coating technologies according to the invention, silicon nitride particles are contained in an oxide-nitride binder matrix, whereby the oxide-nitride binder matrix occupies 10–40% by volume of the total volume of the powder and the powder particle size is $d_{90} \leq 100$ μm.

The oxide-nitride binder matrix is advantageously in the amorphous or partly crystalline state, contains sintering additives standard for silicon nitride, $SiO_2$, and partly dissolved silicon nitride, and forms a liquid phase under thermal coating conditions.

It is also advantageous that, additionally, aluminum and oxygen are incorporated into the β-silicon nitride particles according to the formula $Si_{6-z}Al_zN_{8-z}O_z$ where $z \leq 4$ or $z \leq 3$.

Additionally, $\leq 30\%$ by volume of the mixture of additional components, such as TiN, SiC, or metal silicide particles are advantageously contained in the oxide-nitride binder matrix. Also advantageously the powder particle size falls within the range of 20–63 μm or 20–45 μm.

And also advantageously the oxide-nitride binder matrix occupies 20–35% by volume of the total volume of powder.

In the modified silicon nitride composite powder for thermal coating technologies also according to the invention, the silicon binder matrix contains silicon nitride particles, whereby the silicon binder matrix occupies 10–40% by volume of the total volume of the powder and the powder particle size is $d_{90} \leq 100$ μm.

Advantageously the silicon binder matrix contains metal silicides and silicon and forms a liquid phase under thermal coating conditions.

In it also advantageous that, additionally, aluminum and oxygen are incorporated in the β-silicon nitride particles according to the formula $Si_{6-z}Al_zN_{8-z}O_z$ where $z \leq 4$ or $z \leq 3$.

Advantageously contained in the silicon binder matrix with a content of $\leq 50\%$ by volume.

Also advantageously the powder particle size falls within the range of 20–63 μm or 20–45 μm.

And also advantageously the silicon binder matrix occupies 20–35% by volume of the total volume of the powder.

The aim of the invention is further achieved through a process for producing a modified silicon nitride composite powder in which, for producing a modified silicon nitride composite powder having an oxide-nitride binder matrix, a mixture is made that contains silicon nitride and/or silicon and one or more oxides or mixtures of oxides or in which, for producing a modified silicon nitride composite powder having a silicon binder matrix, a mixture is made that contains silicon or silicon and silicon nitride, the mixture is homogenized and then granulated, subjected to single or multi-stage tempering in a nitrogen-containing atmosphere at a pressure of 0.5 to 100 bar and ground.

Advantageously the tempering temperature for producing a modified silicon nitride composite powder with an oxide-nitride binder matrix is selected between 1,300 and 1,950° C.

It is further advantageous to use as an oxide or mixtures of oxides for producing a modified silicon nitride composite powder having an oxide-nitride binder matrix, $Al_2O_3$, $Y_2O_3$, oxides of rare-earth metals, MgO, $ZrO_2$ or mixtures thereof, and 0 to 18% by weight AlN in relation to the composite powder.

It is also advantageous if, for producing a modified silicon nitride composite powder having a silicon binder matrix, a mixture is made that additionally contains aluminum nitride and aluminum oxide in the molar ratio of 1:1.

Further advantageously, for producing a modified silicon nitride composite powder having a silicon binder matrix, the tempering temperature is selected below the melting temperature of silicon.

It is also advantageous that, for producing a modified silicon nitride composite powder having a silicon binder matrix, the level of nitrogen content of the nitrogen-containing atmosphere for the tempering makes it possible to obtain 10–40% of the binder matrix.

Additional substances are also added advantageously as raw materials.

For producing a modified silicon nitride composite powder having an oxide-nitride binder matrix, $\leq 30\%$ by volume of additional components, such as TiN, SiC, or metal silicide particles, are used as these additional substances.

As these addtional substances, advantageously $\leq 20\%$ by volume of silicides of metals, such as Fe, Ni, Co, Cr, or Mo or for forming $\leq 20\%$ by volume silicides, silicide-forming metals such as Fe, Ni, Co, Cr, or Mo are used for producing a modified silicon nitride composite powder having a silicon binder matrix. The silicides can be formed from the metals during the tempering.

It is also advantageous if the granulation occurs by means of spray drying.

It is also advantageous if the granulation takes place by means of molding of the homogenized mixture of the raw materials and grinding of the compact(s).

The aim is further achieved by means of a process for producing a modified silicon nitride composite powder having a silicon binder matrix, in which a mixture is made that contains silicon, the mixture is homogenized and granulated, and the granulate is sprayed at temperatures above the melting temperature of silicon into a liquid.

DETAILED DESCRIPTION

For producing thermal sprayed coatings with different technologies (e.g. variants of plasma sprayig such as APS, CAPS, and VPS [LPPS], variants of flame spraying such as high velocity oxy-fuel spraying [HVOF], and laser cladding), spray powders are required the properties of which have a large influence on the serviceability of the coatings. Among the most important requirements is a full or at lest partial melting in the spray process, high density, and good flowability of the powder.

Since silicon nitride itself does not form a molten phase, it can be processed by means of thermal spray processes into coatings having low porosity only as a composite powder. Oxides and mixtures of oxides and silicon are obvious as molten phases. Particularly with materials having a low specific density the morphology of the powder is of significance. Spherical powder particles or granules that are made in the sizes required for the thermal spray processes advantageously by means of spray drying, exhibit the best flowability. Frequently however, the porosity of the powder particles or granules is transferred through the spray process to the coating. Therefore, it is desirable to make spray-dried (green) powder particles or granules as dense as possible, which are further densified through a sintering process, so that the powder particles or granules are characterized by a porosity of <30%. The lower the porosity i the powder particles or in the granules, the more favorable for subsequent processing.

Through this invention, it is possible, through the synthesis of composite powders having a high silicon nitride content, to provide a powder that can be processed by means of thermal spray processes, such as plasma spraying, for example, into coatings having a high silicon nitride content. In this process, the silicon nitride is contained at 10 to 40% by volume in relation to the total volume of the powder in an oxide binder matrix or in a silicon binder matrix that melts in the spray process. In such processing of the powder, in essence a carry-over into the coating of the structure performed during the tempering process takes place, whereby denitridation is prevented to the greatest possible extent.

It is an advantage of the modified silicon nitride composite powder according to the invention that the silicon nitride particles, in contrast to mechanical mixtures of silicon nitride and binder components, are present in a matrix; therefore they themselves can be finely dispersed with particles sizes <10 $\mu$m and thus can be processed by means of various thermal coating technologies, such as thermal spraying, for example, and are protected against decomposition during the coating process. Through the homogeneous composition of the composite powder according to the invention, very homogeneous coatings can be produced.

For producing a modified silicon nitride composite powder for thermal coating technologies having an oxide-nitride binder matrix, $Si_3N_4$ powder and/or silicon are used with an oxide, such as $Al_2O_3$, $Y_2O_3$ oxides of rare-earth metals, MgO, $ZrO_2$, or mixtures of oxides and 0–18% by weight AlN, in relation to the composite powder, and advantageous other additional components such as TiN, SiC, silicon, or metal silicides.

As known form the prior art for sintering of silicon nitride, the binder matrix is formed through the added sintering additives such as $Al_2O_3$, $Y_2O_3$, MgO, and $SiO_2$, which is available on the surface of the silicon nitride. At the same time, silicon nitride dissolves partly in this matrix, as well. This oxide-nitride binder matrix is liquid above 1,200–1,400° C. and in tempering, permits reprecipitation and transport processes that lead to densification. After cooling to room temperature, this binder matrix hardens either as glass or is partially crystalline.

In producing coatings by means of thermal coating technologies from the modified silicon nitride composite powder having an oxide-nitride binder matrix according to the invention, the oxide-nitride binder matrix has another function. As a result of the short time in which the powder remains at high temperatures during the thermal coating process, no reprecipitation and sintering of the silicon nitride occurs. The liquid phase leads only to a rearrangement of the silicon nitride particles and to an adjustment of the shape of the powder particles in impacting on the surface to be coated.

A silicon nitride coating that is usable for technical applications can be made with the modified silicon nitride composite powder having a silicon binder matrix according to the invention, as well. The advantage of this coating is its electrical conducting capacity (semiconductor/conductor) with a somewhat lower chemical resistance but at the same time an increased hardness. In this case, the task of the binder matrix is the same as with the oxide-nitride binder matrix. It particular, the silicon binder matrix is also in equilibrium with silicon nitride. The solubility of the silicon nitride is less, in this instance, than in the oxide-nitride binder matrix. Therefore, the reprecipitation during the producing of the composite powder from $\alpha$-silicon nitride to $\beta$-silicon nitride proceeds ore slowly, as well. For producing this powder according to the invention having the silicon binder matrix, lower temperatures are required.

The raw materials for the modified silicon nitride composite powders according to the invention are homogenized and then granulated, preferably spray dried. In this process, the suspension and drying parameters are selected so that granulates with the highest possible green density and particle size distribution favorable for the respective subsequent spraying process are provided. In this process, the powder particle size is at $d_{90} \leq 100$ µm, whereby, for individual spraying processes, narrower powder particle size ranges below this powder particle size, such as between 20 and 63 µm or 20 and 45 µm, are favorable. The powder is subject to a one or multi-stage tempering in a nitrogen-containing atmosphere and at a pressure of 0.5 to 100 bar, during which in essence the same processes take place as in the sintering of compacts of analogous composition. In this process, the oxides or the oxide mixtures form a liquid phase, in which $Si_3N_4$ is dissolved and preferably once again precipitates out as $\beta$-$Si_3N_4$. The tempering temperature is selected for producing a modified silicon nitride composite powder having an oxide-nitride binder matrix between 1,300 and 1,950° C. For producing a modified silicon nitride composite powder having a silicon binder matrix, a tempering temperature is selected that is below the melting temperature of silicon. After tempering, preferably $\beta$-$Si_3N_4$ is present in addition to $\alpha$-$Si_3N_4$ in an oxide-nitride binder matrix in the for of a glass phase or of a partially crystalline phase. The phase composition after tempering depends on both the quantity and the composition of the oxide-nitride phase, and on the tempering temperature. As known from the prior art, $Al_2O_3$/AlN can be incorporated into the $\beta$-silicon nitride lattice ($Si_{6-z}Al_zN_{8-z}O_z$ $z \leq 4$).

By means of a gentle grinding process following the tepering, and if applicable, fractionizing, through this procedure an easily flowing silicon nitride composite powder can be produced in which the dense granules posses microstructures like sinterd compacts of analogous composition.

In producing the powder according to the invention, both silicon and silicon nitride or mixtures thereof can be used as raw materials.

In producing modified silicon nitride composite powder having an oxide-nitride binder matrix from silicon or silicon nitride, the first step is nitridation, which is preferable done below the melting temperature of silicon up to a residual silicon content of $\leq 10\%$, as is the state of art for RBSN material. Then the temperature is increased to 1,400–1,950° C. in a nitrogen-containing atmosphere, in order to achieve a partial or complete reduction of porosity. The tempering can be interrupted one or more times, in order to reduce sintering together between the powder particles and to promote the subsequent grinding process. The advantage of the pore reduction is the increase in thermal conductivity and thus the improvement of coating manufacture and coating properties.

In producing modified silicon nitride composite powder having a silicon binder matrix, the quantity of nitrogen is set so that the necessary residual silicon content is maintained. In calculating the quantity of nitrogen, one must proceed on the assumption that the nitrogen reacts quantitatively with the silicon. The tempering takes pace below the melting point of silicon, since otherwise the powder structure is lost.

The silicon nitride particles in the composite powder according to the invention can be both $\beta$-silicon nitride and $\alpha$-silicon nitride. The ratio can be set in a broad range (5–100% $\beta$-silicon nitride) during production of the powder according to the invention. An extension of the tempering process or the increasing of the tempering temperature, in this process, leads to an increase in the proportion of the $\beta$-silicon nitride.

$\alpha$-silicon nitride has greater hardness in comparison to $\beta$-silicon nitride. Needle-shaped $\beta$-silicon nitride structures lead to higher fracture toughness in the sintered material. In a similar manner, the hardness and fracture toughness of the coatings formed from the powders according to the invention can be influenced.

The coating structure can be modified by means of additional components that are maintained as particles in the binder matrix. Such components should be in equilibrium with the silicon nitride and the glass phase during powder production. Such components are TiN, SiC, and metal silicides, for example.

The processing of this silicon nitride composite powder to coatings can, in principle, be done by means of all processes that can be classified as thermal spraying processes. However, preferably plasma spraying processes are used that can better produce the required processing temperature for melting the oxide phase or the silicon phase. For processing, it is further advantageous to create controlled atmospheres in order to reduce oxidation. With the silicon nitride composite powders described according to the invention, coatings can be made by means of thermal spraying whose resistance to wear is comparable to other thermal sprayed coatings. This resistance to wear relates particularly to wear from abrasion and momentary fatigue, even at high temperatures in aggressive environments. Furthermore, these coatings also have a high resistance to temperature change. Additionally bonding coatings that can come from the Fe-Si system, for example, can be sprayed between the substrate and silicon nitride coating, for further improvement of adherence. Depending on the spraying process and particle size of the silicon nitride composite powder used, porosity of less than 2% can be achieved, which contributes to the good wear properties and at the same time results in good corrosion resistance. The coating hardness lies in the order of magnitude of approximately 1,000 $HV_{0.005}$, whereby a higher $\alpha$-$Si_3N_4$ content in the composite powder leads to higher coating hardness. By means of vacuum plasma spraying, coating thickness of up to 500 µm can be achieved.

EXAMPLE

The invention is explained below with reference to several exemplary embodiments.

Example 1

A silicon nitride powder having a composition of 84% by weight $\alpha$-$Si_3N_4$ and 16% by weight $\beta$-$Si_3N_4$ is mixed with 16% by weight $Y_2O_3$ and 16% by weight $Al_2O_3$, which corresponds to approximately 30% by volume binder matrix, and is dispersed in water. With that, a binder was added to this suspension and then granules were produced in a spherical shape by means of spray drying. The binder was removed in air at 450° C. Then the granules were tempered in two stages. In the first stage, the granules were heated at a heating speed of 10 K/min to 1,525° C. in nitrogen (0.13 MPa) and held therefor 5 minutes, then cooled to room temperature and ground to <400 μm. In the second stage, the granules were heated at a heating rate of 10 K/min to 1,550° C. and held there for 1.5 hours. After subsequent cooling to room temperature, careful grinding and fractionating through a 63 μm and then a 32 μm sieve were provided.

The silicon nitride composite powder thus obtained, having a particle size in the range of 32–63 μm was then processed in vacuum plasma spray equipment at a spray chamber pressure of 350 mbar with an Ar-$H_2$ plasma and a plasma power of 45 kW in to a coating having a thickness of approximately 160 μm. The composition of the crystalline phase after spraying was determined with the help of X-ray phase analysis. It was 60% by weight $\alpha$-$Si_3N_4$ and 40% by weight $\beta$-$Si_3N_4$ whereby a slight displacement of the reflex position was observed through incorporation of Al and oxygen into the silicon nitride lattice.

Example 2

A not-fully-nitrided silicon powder having a composition of 48.4% by weight $\alpha$-$Ai_3N_4$, 12.9% by weight $\beta$-$Si_3N_4$, and 38.7% by weight Si was mixed with a silicon nitride powder having a composition of 84% by weight $\alpha$-$Si_3N_4$ and 16% by weight $\beta$-$Si_3N_4$, in a 60:40 ratio, which corresponds to approximately 29% by volume binder matrix, and is dispersed in isopropanol and homogenized. With that, a binder was added to this suspension, and then granules in a spherical shape were formed by means of spray drying. Then the granules were tempered in two stages. In the first stage, the granules were heated to 300° C. within 5 hours, thereafter to 350° C. within 20 minutes and held here for 1 hours, to remove the binder. In the second stage, the granules were heated to 1,370° C. in an argon atmosphere at a heating rate of 10 K/min and held there for 5 hours. After subsequent cooling to room temperature, careful grinding and subsequent size classification by sieving and air classifying to separate the fine material were performed.

The silicon nitride composite powder obtained in this manner, having a particle size in the range of 10–63 μm, having particles of <10 μm of <10%, was then processed at a spray chamber pressure of 60 mbar with an Ar-$H_2$ plasma and a plasma power of 40 kW, into a coating having a thickness of approximately 100 μm.

Example 3

A not-fully-nitrided silicon powder having a composition of 48.4% $\alpha$-$Si_3N_4$, 12.9% by weight $\beta$-$Si_3N_4$, and 38.7% by weight Si and having a particle size of $d_{90}$=5.5 μm, was compressed by means of cold isostatic pressing at 200 MPa, pre-ground in a jaw crusher, further ground to a powder in a vibrating cup mill and then classified. Then the powder was tempered in one stage. The powder is heated to 1,200° C. at a heating rate of 10 K/min and then heated to 1,350° C. at a heating rate of 3 K/min. The powder was held at this temperature for 5 hours. In the furnace chamber, at the start of tempering an atmosphere was set that contains 50 1 nitrogen per kg powder. The silicon content after tempering was 25.3% by weight. After the subsequent cooling to room temperature, careful grinding and fractionating through a 63 μm and then a 32 μm sieve was performed.

The silicon nitride composite powder obtained in this manner having a particle size in the range of 32–63 μm was then processed in vacuum plasma spraying equipment at a spray chamber pressure of 60 mbar with an Ar-$H_2$ plasma and a plasma power of 40 kW into a coating having a thickness of approximately 120 μm.

Example 4

A silicon nitride powder having a composition of 96% by weight $\alpha$-$Si_3N_4$ and 4% by weight $\beta$-$Si_3N_4$ and silicon was mixed in a ratio of 80% by weight silicon nitride and 20% by weight silicon in polyethylene bottles in methanol and ceramic balls within 24 hours, then separated and dried in a furnace at 110° C. for 12 hours. This powder mixture was compressed by means of cold isostatic pressing at 200 bar and, through pulverization of the tile and classification, a powder having a fraction of 40–80 μm was obtained. Through plasma spraying of this powder in an ammonia shroud into water, a flowable composite powder was obtained that was suitable for the actual coating process. This composite powder contained Si, $\alpha/\beta$ silicon nitride, and traces of $SiO_2$. The silicon nitride composite powder obtained in this manner, having a particle size in the range of 40–80 μm, was then processed in vacuum plasma spraying equipment at a spray chamber pressure of 60 mbar with an Ar-$H_2$ plasma and a plasma power of 40 kW in to a coating having a thickness of approximately 120 μm.

Example 5

A silicon nitride powder having a composition of 84% by weight $\alpha$-$Si_3N_4$ and 16% by weight $\beta$-$Si_3N_4$ was mixed with 15% by weight AlN, 44% by weight $Al_2O_3$, and 7% by weight $Y_2O_3$, which corresponds to approximately 15% by volume binder matrix, and was dispersed in isopropanol. With that, a binder was added to this dispersion and then by means of spray drying granules were produced in a spherical shape. The binder was removed in air at 450° C. Then the granules were tempered in three stages. In the first stage, the granules were heated at a heating rate of 10 K/min to 1,525° C. and held there for 5 minutes, then cooled to room temperature and ground to <400 μm. In the second stage, the granules were heated at a heating rate of 10 K/min to 1,550° C. and held there for 1.5 hours. In the third tempering stage, the granules were heated to 1,600° C. and held there for 1.5 hours. All tempering stages were performed at a nitrogen pressure of 0.13 MPa. After subsequent cooling to room temperature, careful grinding and fractionating through a 63 μm and then a 32 μm sieve was performed. A composition of $Si_{6-z}Al_zN_{8-z}O_z$ where z=3.5 was determined after tempering from the lattice parameters in the silicon nitride composite powder produced in this manner.

This silicon nitride composite powder, having a particle size in the range of 32–63 μm, was then processed in vacuum plasma spraying equipment at a spray chamber pressure of 350 mbar with an Ar-$H_2$ plasma and a plasma power of 45 kW in to a coating having a thickness of approximately 150 μm and a porosity of 5%.

What is claimed:

1. Modified silicon nitride composite powder for thermal coating, comprising:
   silicon nitride particles contained in an oxide-nitride binder matrix, wherein the oxide-nitride binder matrix occupies 10–40% by volume of a total volume of the composite powder, and having a composite powder particle size of $d_{90} \leq 100$ μm.

2. The modified silicon nitride composite powder of claim 1, wherein he oxide-nitride binder matrix comprises sintering additives for silicon nitride, $SiO_2$, and partially dissolved silicon nitride, and wherein he oxide-nitride binder matrix is in one of an amorphous state and a partially crystalline state, and wherein he oxide-nitride binder matrix is capable of forming a liquid phase under thermal coating process conditions.

3. The modified silicon nitride composite powder of claim 1, wherein the silicon nitride comprises β-silicon nitride particle which contain aluminum and oxygen according to the formula $Si_{6-z}Al_zN_{8-z}O_z$ where $z \leq 4$.

4. The modified silicon nitride composite powder of claim 3, wherein $z \leq 3$.

5. The modified silicon nitride composite powder of claim 1, wherein the oxide-nitride binder matrix comprises additives at $\leq 30\%$ by volume of the composite powder.

6. The modified silicon nitride composite powder of claim 3, wherein the additives comprise at least one of TiN, SiC, and metal silicide.

7. The modified silicon nitride composite powder of claim 1, wherein the composite powder particle size is 20 to 63 μm.

8. The modified silicon nitride composite powder of claim 1, wherein the composite powder particle size is 20 to 45 μm.

9. The modified silicon nitride composite powder of claim 1, wherein the oxide-nitride binder matrix occupies 20–35% by volume of the total volume of the composite powder.

10. Modified silicon nitride composite powder for thermal coating, comprising:
    silicon nitride particles contained in a silicon binder matrix, wherein the silicon binder matrix occupies 10–40% by volume of a total volume of the composite powder, and having a composite powder particle size of $d_{90} \leq 100$ μm.

11. The modified silicon nitride composite powder of claim 10, wherein the silicon binder matrix comprises metal silicides and silicon, and wherein the silicon binder matrix is capable of forming a liquid phase under thermal coating conditions.

12. The modified silicon nitride composite powder of claim 11, wherein the silicon nitride particles comprise β-silicon nitride particles which contain aluminum and oxygen according to the formula $Si_{6-z}Al_zN_{8-z}O_z$ where $z \leq 4$.

13. The modified silicon nitride composite powder of claim 12, wherein $z \leq 3$.

14. The modified silicon nitride composite powder of claim 10, wherein the silicon binder matrix comprises metal silicide at $\leq 50\%$ by volume of the silicon binder matrix.

15. The modified silicon nitride composite powder of claim 14, wherein the metal silicide comprises at least one of Fe, Ni, Co, Cr, and Mo.

16. The modified silicon nitride composite powder of claim 10, wherein the composite powder particle size is 20 to 63 μm.

17. The modified silicon nitride composite powder of claim 10, wherein the composite powder particle size is 20 to 45 μm.

18. The modified silicon nitride composite powder of claim 10, wherein the silicon binder matrix occupies 20–35% by volume of the total volume of the composite powder.

19. Process for producing a modified silicon nitride composite powder for thermal coating, the composite powder comprising silicon nitride particles contained in an oxide-nitride binder matrix, wherein the oxide-nitride binder matrix occupies 10–40% by volume of a total volume of the composite powder, and having a composite powder particle size of $d_{90} \leq 100$ μm, the process comprising:
    mixing at least one of silicon nitride and silicon, and at least one oxide to form a mixture;
    homogenizing the mixture;
    granulating the mixture;
    tempering the mixture in one of a single stage and a multi-stage in a nitrogen-containing atmosphere at a pressure of 0.5 to 100 bar to form a tempered mixture; and
    grinding the tempered mixture to form the composite powder.

20. The process of claim 19, wherein the at least one oxide comprises a mixture of oxides.

21. The process of claim 19, wherein the tempering temperature is 1300° C. to 1950° C.

22. The process of claim 19, wherein the at lest one oxide comprises at least one of $Al_2O_3$, $Y_2O_3$, rare-earth metal oxide, MgO, and $ZrO_2$.

23. The process of claim 22, wherein the mixture comprises AlN at up to 18% by weight of the mixture.

24. The process of claim 19, wherein the mixture comprises additives at $\leq 30\%$ by volume of the mixture.

25. The process of claim 24, wherein the additives comprise at lest one of TiN, SiC, and metal silicide particles.

26. The process of claim 24, wherein the granulating comprises spray drying.

27. The process of claim 24, wherein the granulating comprises molding the homogenized mixture into at lest one compact, and grinding the at least one compact.

28. Process for producing a modified silicon nitride composite powder for thermal coating, the composite powder comprising silicon nitride particles contained in a silicon binder matrix, wherein the silicon binder matrix occupies 10–40% by volume of a total volume of the composite powder, and having a composite powder particle size of $d_{90} \leq 100$ μm, the process comprising:
    mixing silicon to form a mixture;
    homogenizing the mixture;
    granulating the mixture;
    tempering the mixture in one of a single stage and a multi-stage in a nitrogen-containing atmosphere at a pressure of 0.5 to 100 bar to form a tempered mixture; and
    grinding the tempered mixture to form the composite powder.

29. The process of claim 28, wherein silicon nitride is mixed with the silicon to form the mixture.

30. The process of claim 28, wherein the mixture further comprises aluminum nitride and aluminum oxide in a molar ratio of 1:1.

31. The process of claim 28, wherein the tempering is at a temperature below the melting temperature of silicon.

32. The process of claim 28, wherein then nitrogen-containing atmosphere for the tempering has a level of nitrogen content such that the silicon binder matrix occupies 10–40% by volume of the total volume of the composite powder.

33. The process of claim 28, wherein the mixture further comprises additives.

34. The process of claim 28, wherein the mixture comprises a material silicide at $\leq 20\%$ by volume of the mixture, and wherein the metal silicide comprises one of Fe, Ni, Co, Cr, and Mo.

35. The process of claim 28, wherein the mixture comprises silicide forming metal for forming silicide at $\leq 20\%$ by volume of the mixture, and wherein the silicide forming metal comprises one of Fe, Ni, Co, Cr, and Mo.

36. The process of claim 28, wherein the granulating comprises spray drying.

37. The process of claim 28, wherein the granulating comprises molding the homogenized mixture into at least one compact, and grinding the at least one compact.

38. Process for producing a modified silicon nitride composite powder for thermal coating, the composite powder comprising silicon nitride particles contained in a silicon binder matrix, wherein the silicon binder matrix occupies 10–40% by volume of a total volume of the composite powder, and having a composite powder particle size of $d_{90} \leq 100 \, \mu m$, the process comprising:

mixing silicon to form a mixture;

homogenizing the mixture;

granulating the mixture into granulate;

nitriding the granulate; and spraying the granulate into a liquid at a temperature above the melting temperature of silicon to form the composite powder.

39. The process of claim 38, wherein the mixing comprises mixing silicon and silicon nitride to form the mixture.

* * * * *